United States Patent
Browne et al.

(10) Patent No.: US 8,800,283 B2
(45) Date of Patent: Aug. 12, 2014

(54) METHOD OF STARTING AND OPERATING A SHAPE MEMORY ALLOY HEAT ENGINE

(75) Inventors: Alan L. Browne, Grosse Pointe, MI (US); Nancy L. Johnson, Northville, MI (US); Nilesh D. Mankame, Ann Arbor, MI (US); Paul W. Alexander, Ypsilanti, MI (US); John Andrew Shaw, Dexter, MI (US); Christopher Burton Churchill, Ann Arbor, MI (US); Andrew C. Keefe, Encino, CA (US); Guillermo A. Herrera, Winnetka, CA (US); Jeffrey W Brown, Los Gatos, CA (US); Richard J. Skurkis, Lake Orion, MI (US)

(73) Assignees: GM Global Technology Operations LLC, Detroit, MI (US); Dynalloy Inc., Tustin, CA (US); The Regents of the University of Michigan, Ann Arbor, MI (US)

( * ) Notice: Subject to any disclaimer, the term of this patent is extended or adjusted under 35 U.S.C. 154(b) by 114 days.

(21) Appl. No.: 13/340,897

(22) Filed: Dec. 30, 2011

(65) Prior Publication Data
US 2012/0216525 A1  Aug. 30, 2012

Related U.S. Application Data (60) Provisional application No. 61/447,317, filed on Feb. 28, 2011, provisional application No. 61/447,315, filed on Feb. 28, 2011, provisional application No. 61/447,328, filed on Feb. 28, 2011, provisional application No. 61/447,321, filed on Feb. 28, 2011, provisional application No. 61/447,306, filed on Feb. 28, 2011, provisional application No. 61/447,324, filed on Feb. 28, 2011.

(51) Int. Cl.
*F01B 29/10* (2006.01)
*F02G 1/04* (2006.01)

(52) U.S. Cl.
USPC .................. 60/527; 60/528; 60/529; 60/616; 60/618; 60/620

(58) Field of Classification Search
USPC ............ 60/527–529, 616, 618, 620; 148/402, 148/421, 563; 420/902
See application file for complete search history.

(56) References Cited

U.S. PATENT DOCUMENTS

| | | | | |
|---|---|---|---|---|
| 3,303,642 A | * | 2/1967 | Lee, II | 60/530 |
| 3,316,415 A | * | 4/1967 | Taylor | 290/1 R |

(Continued)

FOREIGN PATENT DOCUMENTS

| | | | | |
|---|---|---|---|---|
| GB | 2072756 A | * | 10/1981 | F03G 7/06 |
| GB | 2155113 A | * | 9/1985 | F03G 7/06 |
| GB | 2321280 A | * | 7/1998 | F03G 7/06 |

*Primary Examiner* — Kenneth Bomberg
*Assistant Examiner* — Daniel Wagnitz
(74) *Attorney, Agent, or Firm* — Quinn Law Group, PLLC (57) ABSTRACT

A shape memory alloy (SMA) heat engine includes a first rotatable pulley, a second rotatable pulley, and an SMA material disposed about the first and second rotatable pulleys and between a hot region and a cold region. A method of starting and operating the SMA heat engine includes detecting a thermal energy gradient between the hot region and the cold region using a controller, decoupling an electrical generator from one of the first and second rotatable pulleys, monitoring a speed of the SMA material about the first and second rotatable pulleys, and re-engaging the driven component if the monitored speed of the SMA material exceeds a threshold. The SMA material may selectively change crystallographic phase between martensite and austenite and between the hot region and the cold region to convert the thermal gradient into mechanical energy.

10 Claims, 4 Drawing Sheets

(56) References Cited

U.S. PATENT DOCUMENTS

| | | | |
|---|---|---|---|
| 3,321,908 A * | 5/1967 | Katchalsky et al. | 60/721 |
| 4,055,955 A * | 11/1977 | Johnson | 60/527 |
| 4,075,846 A * | 2/1978 | Li | 60/527 |
| 4,150,544 A * | 4/1979 | Pachter | 60/527 |
| 4,246,754 A * | 1/1981 | Wayman | 60/527 |
| 4,275,561 A * | 6/1981 | Wang | 60/527 |
| 4,305,250 A * | 12/1981 | Cory | 60/527 |
| 4,472,939 A * | 9/1984 | Wang | 60/527 |
| 4,785,627 A * | 11/1988 | Al-Jaroudi | 60/527 |
| 4,965,545 A * | 10/1990 | Johnson | 337/140 |
| 5,419,788 A * | 5/1995 | Thoma et al. | 148/402 |
| 5,842,312 A * | 12/1998 | Krumme et al. | 52/167.1 |
| 6,226,992 B1 * | 5/2001 | Kutlucinar et al. | 60/528 |
| 2005/0039452 A1 * | 2/2005 | Howard | 60/527 |
| 2005/0215366 A1 * | 9/2005 | Serkh | 474/74 |
| 2006/0154763 A1 * | 7/2006 | Serkh | 474/59 |
| 2008/0153638 A1 * | 6/2008 | Serkh | 474/74 |
| 2008/0173017 A1 * | 7/2008 | St. James | 60/608 |
| 2009/0026278 A1 * | 1/2009 | Latner | 236/1 C |
| 2009/0151924 A1 | 6/2009 | Lake | |
| 2010/0186783 A1 * | 7/2010 | Knafl et al. | 134/166 C |
| 2012/0041438 A1 * | 2/2012 | Nau et al. | 606/45 |

* cited by examiner

METHOD OF STARTING AND OPERATING A SHAPE MEMORY ALLOY HEAT ENGINE

CROSS-REFERENCE TO RELATED APPLICATIONS

This application claims the benefit of U.S. Provisional Application No. 61/447,317; U.S. Provisional Application No. 61/447,315; U.S. Provisional Application No. 61/447,328; U.S. Provisional Application No. 61/447,321; U.S. Provisional Application No. 61/447,306; and U.S. Provisional Application No. 61/447,324; all filed Feb. 28, 2011. All of which are hereby incorporated by reference in their entirety.

STATEMENT REGARDING FEDERALLY SPONSORED RESEARCH OR DEVELOPMENT

This invention was made with U.S. Government support under an Agreement/Project number: ARPA-E Contract number DE-AR0000040. The U.S. Government may have certain rights in this invention.

TECHNICAL FIELD

The present invention generally relates to energy harvesting systems, and more specifically, to shape-memory alloy heat engines.

BACKGROUND

Thermal energy is produced by many industrial, assembly, and manufacturing processes. Automobiles, small equipment, and heavy equipment also produce thermal energy. Some of this thermal energy is waste heat, which is heat produced by machines, electrical equipment, and industrial processes for which no useful application is found or planned, and is generally a waste by-product. Waste heat may originate from machines, such as electrical generators, or from industrial processes, such as steel, glass, or chemical production. The burning of transport fuels also contributes to waste heat.

SUMMARY

A shape memory alloy (SMA) heat engine may include a first rotatable pulley, a second rotatable pulley, and an SMA material disposed about the first and second rotatable pulleys and between a hot region and a cold region. A method of starting and operating the SMA heat engine may then include detecting a thermal energy gradient between the hot region and the cold region using a controller, decoupling an electrical generator from one of the first and second rotatable pulleys, monitoring a speed of the SMA material about the first and second rotatable pulleys, and re-engaging the driven component if the monitored speed of the SMA material exceeds a threshold. The SMA material may selectively change crystallographic phase between martensite and austenite and between the hot region and the cold region to convert the thermal gradient into mechanical energy.

In one configuration, the electrical generator may be decoupled from the rotatable pulley at the direction of the controller, such as by commanding a coupling device to disengage. The coupling device may, for example, include an electrically actuated clutch. Furthermore, the controller may monitor a temperature of the SMA material and modify the gear ratio of the adaptive torque transmitting device to reduce a torque load on the heat engine if the temperature of the SMA material exceeds a predetermined threshold. In this manner, the controller may reduce the load felt by the SMA heat engine.

The above features and advantages and other features and advantages of the present invention are readily apparent from the following detailed description of the best modes for carrying out the invention when taken in connection with the accompanying drawings.

DETAILED DESCRIPTION

Figure 1:
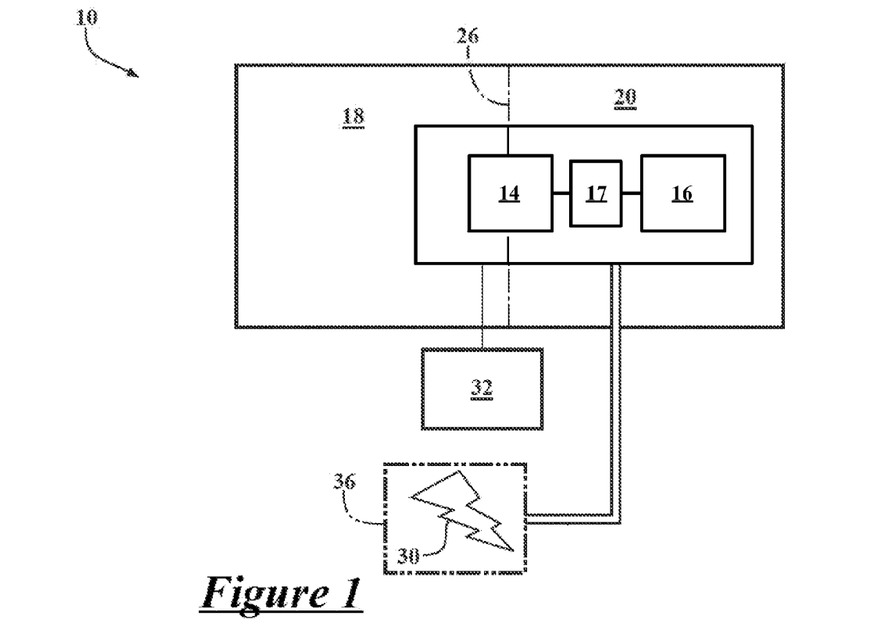
FIG. 1 is a schematic diagram of an energy harvesting system including a shape memory alloy heat engine.

Referring to the drawings, wherein like reference numbers correspond to like or similar components whenever possible throughout the several figures, there is shown in FIG. 1 an energy harvesting system 10. Features and components shown and described in other figures may be incorporated and used with those shown in FIG. 1. The energy harvesting system 10 shown includes a heat engine 14, a driven component 16, and a coupling device 17 configured to selectively couple the driven component 16 with the heat engine 14.

The energy harvesting system 10 utilizes a first fluid region or a hot region 18, having a first temperature. The hot region 18 may be in heat transfer communication with a heat source, such as waste heat, or may represent any region of relatively warm temperature to contribute to operation of the heat engine 14, as described herein. The energy harvesting system 10 also utilizes a second fluid region or a cold region 20, having a second temperature, which is generally lower than the first temperature of the hot region 18. The cold region 20 may be in heat transfer communication with a cooling source, such as a cold fluid, or may represent any region of relatively cool temperature to contribute to operation of the heat engine 14, as described herein. The designation of the hot region 18 and the cold region 20, or the temperatures associated therewith as either "first" or "second" is arbitrary and is not limiting.

The heat engine 14, as described herein, is configured to convert thermal energy from the hot region 18 into mechanical energy. The driven component 16 of the energy harvesting system 10 may be configured to be driven by the mechanical energy or power generated from the conversion of thermal energy to mechanical energy within the heat engine 14.

The driven component 16 may be a mechanical device, such as, without limitation: a generator, a fan, a clutch, a blower, a pump, a compressor, and combinations thereof. It should be appreciated that the driven component 16 is not limited to these devices, as any other device known to those skilled in the art may also be used. The driven component 16 may be operatively connected to the heat engine 14 such that the driven component 16 is driven by the heat engine 14.

More specifically, the driven component 16 may be part of an existing system, such as a heating or cooling system and the like. Driving the driven component 16 with mechanical energy provided by the heat engine 14 may also allow an associated existing system within the energy harvesting system 10 to be decreased in size and/or capacity or eliminated entirely.

Additionally, the mechanical energy produced by the energy harvesting system 10 may be stored for later use or as an auxiliary energy supply. In vehicles or power production facilities, the energy harvesting system 10 increases the overall efficiency of the vehicle or production facility by converting what may have been waste thermal energy into energy for current or later use.

The driven component 16 may be a generator or an electric machine (which may be referred to as a motor/generator) configured to convert the mechanical energy from the heat engine 14 into electricity 30 (as schematically shown in FIG. 1). Alternatively, the driven component 16 may be attached to, or in communication with, a generator. The driven component 16 may be any suitable device configured to convert mechanical energy to electricity 30. For example, the driven component 16 may be an electric machine that converts mechanical energy to electricity 30 using electromagnetic induction. The driven component 16 may include a rotor (not shown) that rotates with respect to a stator (not shown) to generate electricity 30. The electricity 30 generated by the driven component 16 may then be used to assist in powering one or more electric systems or may be stored in an energy storage device.

The hot region 18 and the cold region 20 may be sufficiently spaced from one another to maintain the temperature differential between the two, or may be separated by a sufficient heat exchange barrier 26, including, without limitation: a heat shield, a Peltier device, or an insulating barrier. The heat exchange barrier 26 may be employed to separate the heat engine 14 into the hot region 18 and the cold region 20 such that a desired temperature differential between the hot region 18 and the cold region 20 is achieved. When the heat exchange barrier 26 disposed between the hot region 18 and the cold region 20 is a Peltier device, such as a thermoelectric heat pump, the heat exchange barrier 26 is configured to generate heat on one side of the barrier 26 and to cool on an opposing side of the barrier 26.

The hot region 18 and the cold region 20 of the energy harvesting system 10 may be filled with, for example and without limitation: gas, liquid, or combinations thereof. Alternatively, the hot region 18 and the cold region 20 may represent contact zones or contact elements configured for conductive heat transfer with the heat engine 14.

The heat engine 14 is configured to utilize temperature differentials/gradients between the hot region 18 and the cold region 20 in the energy harvesting system 10 in areas such as, without limitation: vehicular heat and waste heat, power generation heat and waste heat, industrial waste heat, geothermal heating and cooling sources, solar heat and waste heat, and combinations thereof. It should be appreciated that the energy harvesting system 10 may be configured to utilize temperature differentials in numerous other areas and industries.

Figure 2:
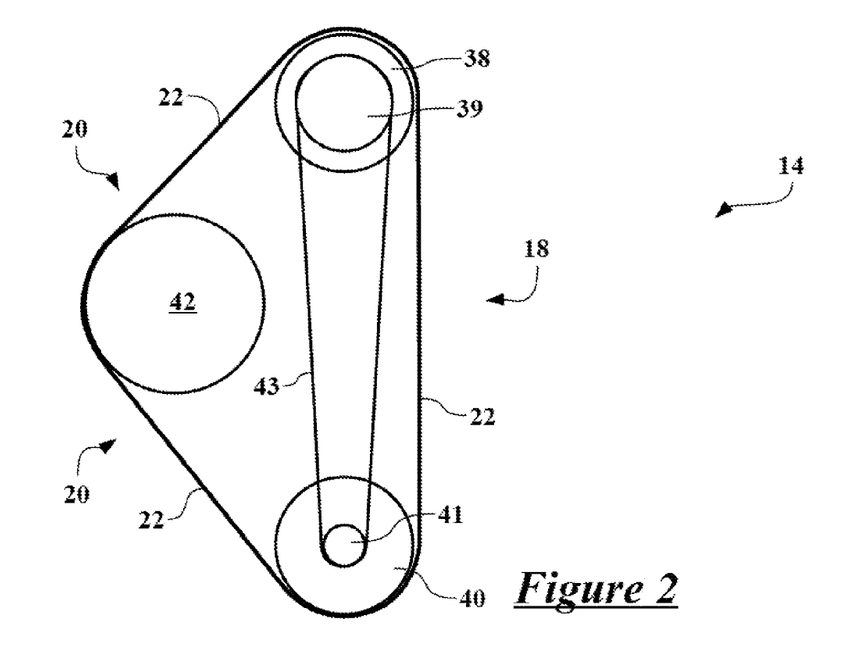
FIG. 2 is a schematic side view of the heat engine of FIG. 1.
Figure 3:
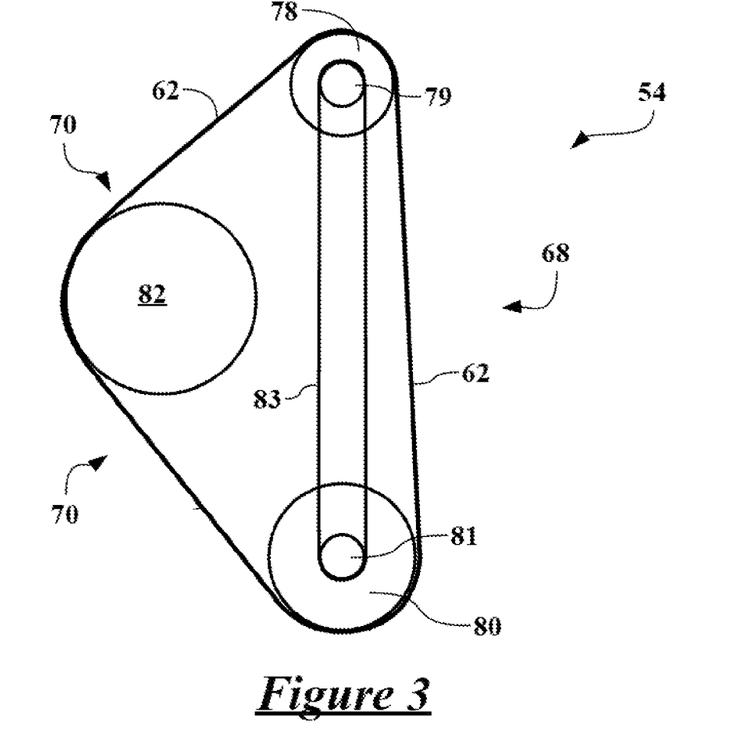
FIG. 3 is a schematic side view of another heat engine usable with the energy harvesting system of FIG. 1.

Referring now to FIG. 2, and with continued reference to FIG. 1, there is shown a more-detailed schematic view of the heat engine 14 shown in FIG. 1. Other types and configurations of heat engines may be used with the heat recovery system 10 shown in FIG. 1. FIG. 3 shows another heat engine 54 which may also be used with the heat recovery system 10 shown in FIG. 1, and includes many similar components and functions similarly to the heat engine 14.

The heat engine 14 of FIG. 2 includes a shape memory alloy material 22 and is operatively disposed in, or in heat-exchange communication with, the hot region 18 and the cold region 20. In the configuration shown, the hot region 18 may be adjacent to a heat exhaust pipe and the cold region 20 may be placed in ambient air or in the path of moving, relatively cool, air from fans or blowers.

The heat engine 14 also includes a first member or first pulley 38 and a second member or second pulley 40. The first pulley 38 and the second pulley 40 may also be referred to as drive pulleys. The heat engine 14 also includes an idler pulley 42, adds travel to the path of the shape memory alloy material 22 and may be configured to variably add tension (or take up slack) to the shape memory alloy material 22.

In this configuration, the first pulley 38 and the second pulley 40 are disposed between the hot region 18 and the cold region 20. However, the heat engine may be configured with the first pulley operatively disposed in the hot region 18 and the second pulley 40 operatively disposed in the cold region 20, or the reverse. The idler pulley 42 may likewise be disposed in the cold region 20.

The heat engine 14 further includes two timing members, a first timing pulley 39 and a second timing pulley 41, which are fixed to the first pulley 38 and the second pulley 40, respectively. The first timing pulley 39 and the second timing pulley 41 provide a mechanical coupling between the first pulley 38 and the second pulley 40 (the two drive pulleys) such that rotation of either drive pulley ensures the rotation of the other in the same direction.

The first timing pulley 39 and the second timing pulley 41 are linked by a timing chain or timing belt 43. Alternatively, a timing mechanism such as sprockets linked with a chain or meshed gears may also be used to provide a mechanical coupling between the first pulley 38 and the second pulley 40. As may be appreciated, other synchronizing means may be employed to accomplish the same or similar function. Inclusion of the mechanical coupling provided by the timing chain 43 (in addition to the shape memory alloy material 22) between the first pulley 38 and the second pulley 40, means that the heat engine 14 may be referred to as a synchronized heat engine.

In one configuration, the first pulley 38 and first timing pulley 39 may be integrated into a single pulley, whereby the SMA material 22 may be maintained at a first radial distance, and the timing cable 43 may be maintained at a second radial distance. Likewise, the second pulley 40 and second timing pulley 41 may be integrated into a single pulley, whereby the SMA material 22 may be maintained at a third radial distance, and the timing cable 43 may be maintained at a fourth radial distance. The first and third distances may define a SMA pulley ratio, and the second and fourth distances may define a timing pulley ratio, which may be different than the SMA pulley ratio.

In the embodiment shown in FIG. 2, the first timing pulley 39 is larger in diameter than the second timing pulley 41. However, in the embodiment shown in FIG. 3, the timing pulleys are substantially the same size but a first pulley 78 is larger in diameter than a second pulley 80. The difference in diameter alters the reactive torque or moment arm provided by the respectively pulley members. Different moments arms about the pulleys (i.e. differences in pulley ratios) cause a resultant torque to be generated from the contraction forces, as explained herein, along the shape memory alloy material 22 adjacent the hot region 18.

The heat engine 14 is configured to convert thermal energy to mechanical energy and, with the help of the driven component 16, convert mechanical energy to electrical energy. More specifically, the energy harvesting system 10 utilizes a temperature differential between the hot region 18 and the cold region 20 to generate mechanical and/or electrical energy via the shape memory alloy material 22, as explained in more detail below. The mechanical and electrical energy created from available thermal energy may be used or stored, as opposed to allowing the thermal energy to dissipate.

The shape memory alloy material 22 is disposed in thermal contact, or heat-exchange communication, with each of the hot region 18 and the cold region 20. The shape memory alloy material 22 of the heat engine 14 has a crystallographic phase changeable between austenite and martensite in response to exposure to the first and second temperatures of the hot region 18 and the cold region 20.

As used herein, the terminology "shape memory alloy" (often abbreviated as "SMA") refers to alloys which exhibit a shape memory effect. That is, the shape memory alloy material 22 may undergo a solid state, crystallographic phase change to shift between a martensite phase, i.e., "martensite", and an austenite phase, i.e., "austenite." Alternatively stated, the shape memory alloy material 22 may undergo a displacive transformation rather than a diffusional transformation to shift between martensite and austenite. A displacive transformation is a structural change that occurs by the coordinated movement of atoms (or groups of atoms) relative to their neighbors. In general, the martensite phase refers to the comparatively lower-temperature phase and is often more deformable—has a lower modulus—than the comparatively higher-temperature austenite phase.

The temperature at which the shape memory alloy material 22 begins to change from the austenite phase to the martensite phase is known as the martensite start temperature, $M_s$. The temperature at which the shape memory alloy material 22 completes the change from the austenite phase to the martensite phase is known as the martensite finish temperature, $M_f$. Similarly, as the shape memory alloy material 22 is heated, the temperature at which the shape memory alloy material 22 begins to change from the martensite phase to the austenite phase is known as the austenite start temperature, $A_s$. The temperature at which the shape memory alloy material 22 completes the change from the martensite phase to the austenite phase is known as the austenite finish temperature, $A_f$.

Therefore, the shape memory alloy material 22 may be characterized by a cold state, i.e., when a temperature of the shape memory alloy material 22 is below the martensite finish temperature $M_f$ of the shape memory alloy material 22. Likewise, the shape memory alloy material 22 may also be characterized by a hot state, i.e., when the temperature of the shape memory alloy material 22 is above the austenite finish temperature $A_f$ of the shape memory alloy material 22.

In operation, shape memory alloy material 22 that has been pre-strained by subjecting it to tensile stress while in the martensitic phase can change dimension upon changing crystallographic phase in response to thermal input to thereby convert thermal energy to mechanical energy. That is, the shape memory alloy material 22 may change crystallographic phase upon heating from martensite to austenite and thereby dimensionally contract if pseudoplastically pre-strained so as to convert thermal energy to mechanical energy. Conversely, the shape memory alloy material 22 when cooled may change crystallographic phase from austenite to martensite and if under stress thereby dimensionally stretch so as to also convert thermal energy to mechanical energy.

Pseudoplastically pre-strained refers to stretching of the shape memory alloy material 22 while in the martensite phase so that the strain exhibited by the shape memory alloy material 22 under that loading condition is not fully recovered when unloaded, where purely elastic strain would be fully recovered. In the case of the shape memory alloy material 22, it is possible to load the material such that the elastic strain limit is surpassed and deformation takes place in the martensitic crystal structure of the material prior to exceeding the true plastic strain limit of the material. Strain of this type, between those two limits, is pseudoplastic strain, called such because upon unloading it appears to have plastically deformed. However, when heated to the point that the shape memory alloy material 22 transforms to its austenite phase, that strain can be recovered, returning the shape memory alloy material 22 to the original length observed prior to application of the load.

The shape memory alloy material 22 may be stretched before installation into the heat engine 14, such that a nominal length of the shape memory alloy material 22 includes recoverable pseudoplastic strain. Alternating between the pseudoplastic deformation state (relatively long length) and the fully-recovered austenite phase (relatively short length) provides the motion used for actuating or driving the heat engine 14. Without pre-stretching the shape memory alloy material 22, little deformation would be seen during phase transformation.

The shape memory alloy material 22 may change both modulus and dimension upon changing crystallographic phase to thereby convert thermal energy to mechanical energy. More specifically, the shape memory alloy material 22, if pseudoplastically pre-strained, may dimensionally contract upon changing crystallographic phase from martensite to austenite and may dimensionally expand (be stretched), if under tensile stress, upon changing crystallographic phase from austenite to martensite to thereby convert thermal energy to mechanical energy. Therefore, when a temperature differential exists between the first temperature of the hot region 18 and the second temperature of the cold region 20, i.e., when the hot region 18 and the cold region 20 are not in thermal equilibrium, respective localized regions of the shape memory alloy material 22 disposed within the hot region 18 and the cold region 20 may respectively dimensionally expand and contract upon changing crystallographic phase between martensite and austenite.

The shape memory alloy material 22 may have any suitable composition. In particular, the shape memory alloy material 22 may include an element selected from the group including, without limitation: cobalt, nickel, titanium, indium, manganese, iron, palladium, zinc, copper, silver, gold, cadmium, tin, silicon, platinum, gallium, and combinations thereof. For example, and without limitation, suitable shape memory alloys 22 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof.

The shape memory alloy material 22 can be binary, ternary, or any higher order so long as the shape memory alloy material 22 exhibits a shape memory effect, i.e., a change in shape orientation, damping capacity, and the like. The specific shape memory alloy material 22 may be selected according to desired operating temperatures of the hot region 18 and the cold region 20, as set forth in more detail below. In one specific example, the shape memory alloy material 22 may include nickel and titanium.

As shown in FIG. 1, the energy harvesting system 10 may include a control system 32 that is configured to monitor the first and second temperature of the fluid in the hot region 18 and the cold region 20, respectively. The control system 32 may be operatively connected to any of the components of the energy harvesting system 10.

The control system 32 may be a computer that electronically communicates with one or more controls and/or sensors of the energy harvesting system 10. For example, the control system 32 may communicate with temperature sensors within the hot region 18 and the cold region 20, a speed regulator of the driven component 16, fluid flow sensors, and/or meters configured for monitoring electricity 30 generation of the driven component 16.

Additionally, the control system 32 may be configured to control the harvesting of energy under predetermined conditions of the energy harvesting system 10, e.g., after the energy harvesting system 10 has operated for a sufficient period of time such that a temperature differential between the hot region 18 and the cold region 20 is at a sufficient, or an optimal, differential. Other predetermined conditions of the energy harvesting system 10 may also be used. The control system 32 may also be configured to provide an option to manually override the heat engine 14 and allow the energy harvesting system 10 to effectively be turned off, such as when the thermal energy supplying the hot region 18 is at too high a temperature resulting in excessive heating of the SMA or is needed elsewhere and should not be converted into other forms of energy by the heat engine 14. The coupling device 17 may also be controlled by the control system 32 to selectively disengage the heat engine 14 from the driven component 16.

The electricity 30 from the driven component 16 may be communicated to a storage device 36, which may be, without limitation, a battery, battery pack, or another energy storage device. The storage device 36 may be located proximate to, but physically separate from, the energy harvesting system 10.

For any of the examples discussed herein, the energy harvesting system 10 may include a plurality of heat engines 14 and/or a plurality of driven components 16. Likewise, the energy harvesting system 10 may be coupled or operated in conjunction with additional energy harvesting systems 10, where each energy harvesting system 10 includes at least one heat engine 14 and at least one driven component 16. The use of multiple heat engines 14 may take advantage of multiple regions of temperature differentials throughout the energy harvesting system 10.

Referring again to FIG. 2, the first pulley 38 and the second pulley 40 may also be, without limitation: a gear, a one-way clutch, or a spring. A one-way clutch may be configured to allow rotation of the first pulley 38 and the second pulley 40 in only one direction.

The first pulley 38, the second pulley 40, or the idler pulley 42 is operatively connected to the driven component 16 such that rotation—as a result of the dimensional change of the shape memory alloy material 22—drives the driven component 16. Furthermore, each of the pulley members may be connected to the driven component 16, or may feed into a transmission or gear system before transferring mechanical energy to the driven member 16. Although three rotational members are shown in FIG. 2, it should be appreciated that more or fewer members may be used.

As described herein, the shape memory alloy material 22 may be embedded within a belt or formed in cables or braids. Furthermore, the shape memory alloy material 22 may be configured as a longitudinally extending wire that is embedded within the belt such that the belt longitudinally stretches and contracts as a function of the associated shape memory alloy material 22 may also be stretching and contracting. Additionally, or alternatively, the shape memory alloy material 22 may be configured as one or more helical springs that may be embedded within the belt. The shape memory alloy material 22 may be a wire that has any desired cross-sectional shape, i.e., round, rectangular, octagonal, ribbon, or any other shape known to those skilled in the art. Additionally, the belt may be at least partially formed from a resilient material. For example, the resilient material may be an elastomer, a polymer, combinations thereof, and the like. The belt may be formed as a continuous loop, as shown in FIGS. 2 and 3, or as an elongated strip.

In operation of the heat engine 14 shown in FIG. 2, a localized region of the shape memory alloy member 22 may be disposed within, or directly adjacent to, the hot region 18 such that the first temperature causes that corresponding localized region of the shape memory alloy material 22 to longitudinally contract as a function of the first temperature of the hot region 18. Similarly, another localized region of the shape memory alloy material 22 may be similarly disposed within, or adjacent to, the cold region 20 such that the second temperature causes that localized region of the shape memory alloy material 22 to longitudinally expand as a function of the second temperature of the cold region 20.

For example, if the first temperature of the hot region 18 is at or above the hot state, the associated localized region of the shape memory alloy material 22 will longitudinally contract as a result of a phase change of the shape memory alloy material 22 from the martensite phase to the austenite phase. Similarly, if the second temperature of the cold region 20 is below the cold state, the associated localized region of the shape memory alloy material 22 will longitudinally be stretched by the tension in the shape memory alloy material 22 as a result of a phase change of the shape memory alloy material 22 from the higher modulus austenite phase to the lower modulus martensite phase.

The shape memory alloy member 22 may be continuously looped about the first pulley 38 and the second pulley 40 such that motion imparted from the shape memory alloy member 22 causes rotation of each of the first pulley 38 and the second pulley 40 (and also the idler pulley 42). The longitudinal stretching and/or contraction of the localized regions of the shape memory alloy material 22 impart motion from the shape memory alloy member 22 to the first pulley 38 and the second pulley 40 to move or drive the driven component 16. The localized regions are those portions of the shape memory alloy member 22 that are in the respective hot region 18 and the cold region 20 at any given moment.

As shown in the heat engine 14 of FIG. 2, when the shape memory alloy member 22 contracts after being heated by the hot region 18, the first timing pulley 39 provides a larger reactive torque than the second timing pulley 41. Therefore, the contraction of the shape memory alloy member 22 between the first pulley 38 and the second pulley 40 (which rotate in common with the first timing pulley 39 and the second timing pulley 41, respectively) causes the shape memory alloy member 22 to move toward the first pulley 38. As the heat engine 14 enters dynamic operation, the shape memory alloy member 22, the first pulley 38, and the second pulley 40 rotate counterclockwise (as viewed in FIG. 2).

The heat engine 14 does not require liquid baths for the hot region 18 and the cold region 20. Therefore, significant portions of the heat engine 14 and the shape memory alloy member 22 are not required to be submersed in liquids.

Referring now to FIG. 3, and with continued reference to FIGS. 1 and 2, there is shown another heat engine 54, which may also be incorporated and used with the heat recovery system 10 shown in FIG. 1. Features and components shown and described in other figures may be incorporated and used with those shown in FIG. 2. The heat engine 54 is disposed in heat-exchange communication with a hot region 58 and a cold region 60. The heat engine 54 includes a shape memory alloy member 62 traveling a continuous loop around a first pulley 78, a second pulley 80, and an idler pulley 82.

A first timing pulley 79 and a second timing pulley 81 are mechanically coupled by a timing chain 83. Inclusion of the mechanical coupling provided by the timing chain 83 (in addition to the shape memory alloy member 62) between the first pulley 78 and the second pulley 80, means that the heat engine 54 may also be referred to as a synchronized heat engine.

Unlike the heat engine 14 shown in FIG. 2, in the heat engine 54 of FIG. 3, the first timing pulley 79 and the second timing pulley 81 are substantially equal in diameter. In one configuration, the first and second timing pulleys 79, 81 may be the respective axles of the first and second pulleys 78, 80. In the heat engine 54, the second pulley 80 has a larger diameter than the first pulley 78.

As shown in the heat engine 54 of FIG. 3, when the shape memory alloy member 62 contracts after being heated by the hot region 58, the second pulley 80 creates a larger moment arm than the first pulley 78. However, the first timing pulley 79 and the second timing pulley 81 provide equal reaction torque. Therefore, the contraction of the shape memory alloy member 62 between the first pulley 78 and the second pulley 80 causes the shape memory alloy member 62 to again move toward the first pulley 78. As the heat engine 54 enters dynamic operation, the shape memory alloy member 62, the first pulley 78, and the second pulley 80 rotate counterclockwise (as viewed in FIG. 3).

Figure 4:
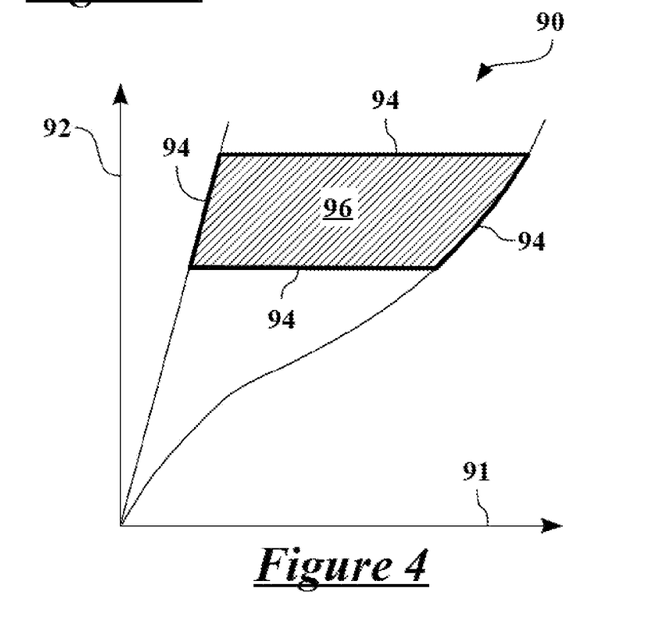
FIG. 4 is a schematic graphical representation of a work diagram for a heat engine, such as those shown in either FIG. 2 or FIG. 3.

Referring now to FIG. 4, and with continued reference to FIGS. 1-3, there is shown a schematic graphical representation of a work diagram 90. An x-axis 91 of the work diagram 90 shows the length of the shape memory alloy member 22 shown in FIG. 2, the shape memory alloy member 62 shown in FIG. 3, or another SMA working member incorporated into a heat engine, such as the heat engine 14 or the heat engine 54. A y-axis 92 of the work diagram 90 shows the tension force of the shape memory alloy member 22 shown in FIG. 2, the shape memory alloy member 62 shown in FIG. 3, or another SMA working member.

The work diagram 90 shows a work path 94 following a location or region of the shape memory alloy member 22 or the shape memory alloy member 62 as it loops during operation of the heat engine 14 or the heat engine 54. Application of a force over a displacement (i.e., a change in length) requires work to be done. A net work zone 96 represents the net work effected by the shape memory alloy member 22 or the shape memory alloy member 62 on each loop. Therefore, the fact that the net work zone 96 is greater than zero shows that the shape memory alloy member 22 or the shape memory alloy member 62 is producing mechanical work from the thermal energy available to the heat engine 14 or the heat engine 54.

Figure 5:
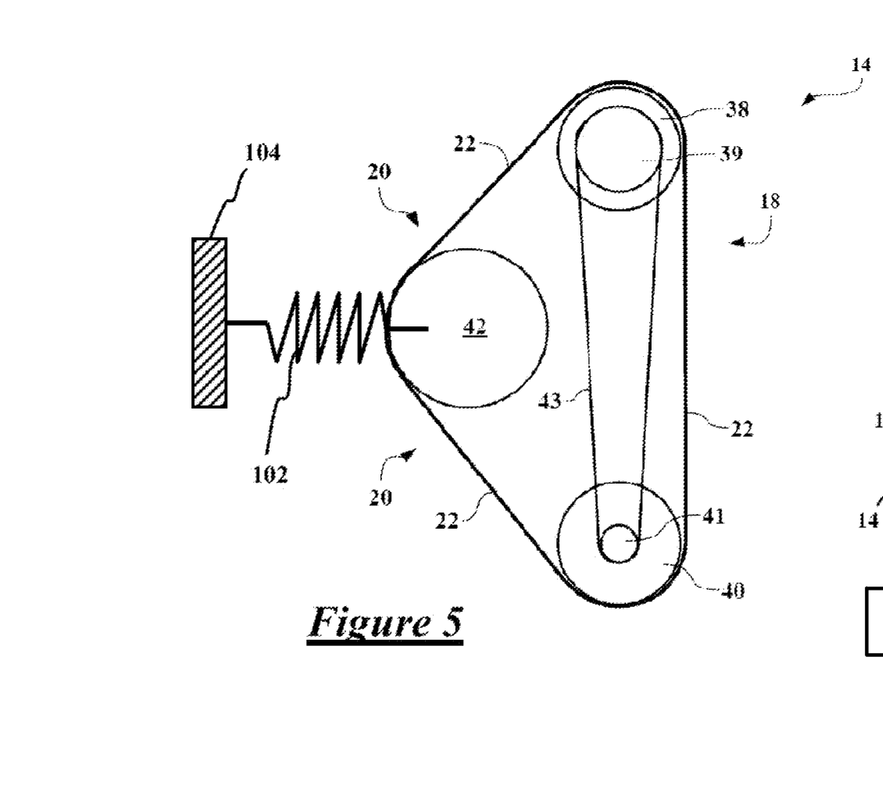
FIG. 5 is a schematic side view of the heat engine of FIG. 1, configured with a spring-biased tensioning pulley.

As generally illustrated in FIG. 5, the heat engine 18 may include an idler pulley 42 within the cold region 20. The idler pulley may be coupled with a spring 102, or some other biasing means which may be used to regulate the tension in the SMA element 22. The spring 102 may be coupled with some relative ground 104 that may provide a stable reactionary force for the spring 102. In one configuration, the relative ground may be a portion of an automobile chassis. In an embodiment, the biasing spring 102 may be constructed from a suitable shape memory alloy that is in its super-elastic configuration.

In addition to accounting for excess slack in the SMA element 22, the spring 102 and idler pulley 42 may also create a geometry, similar to the geometry shown in FIG. 5, where the length of travel for the SMA within the cold region 20 is longer than the length of travel within the hot region 18. Such a geometry may allow the SMA element 22 to more fully cool prior to re-entering the hot region 18 for a subsequent heating-cycle.

To additionally promote full-cooling, the idler pulley 42 may be configured to conduct heat out of the SMA element 22 through direct contact with the SMA. As such, one large-diameter idler pulley 42 may be used, such as shown in FIG. 5, to provide a longer length of direct contact with the SMA 22. Additionally, multiple staggered idler pulleys (not shown) may be used, where the SMA element 22 weaves between the various pulleys for maximized direct contact. To further enhance the contact, the pulleys (including pulleys 38, 40, 42) may be coated with elements to reduce the thermal-resistance between each respective pulley and the SMA element 22. Such coatings may include, for example, oils, rosins, or brush-like surface textures.

To promote heat transfer out of the various pulleys 38, 40, 42, the pulley may have a radially interior impeller portion (i.e., interior to the radially outward SMA guide track) that may promote enhanced convection between any laterally flowing air and the pulley itself. Additionally, to promote a greater surface contact between the pulley and the SMA element 22, in an embodiment, the pulley may have a partially compliant surface for receiving the SMA element.

During operation, it may be advantageous to minimize slip (maximize traction) between the SMA element 22 and the working pulleys 38, 40. As may be understood, any relative slip may reduce the power output that can be extracted from the rotational motion of the system (i.e., full slip=no rotation=no work output). While the pulleys may be coated with anti-slip materials (i.e., coatings to promote better traction), there is also the risk of the material undergoing a phase transformation on the pulley—which may lead to slip. To reduce this risk, both the heating pulley 40 and the cooling pulley 38 may be maintained within a relatively narrow temperature range. For example, the heating pulley 40 may be maintained at a temperature slightly above the martensite start temperature. Likewise, the cooling pulley 38 may be maintained at a temperature slightly below the austenite start temperature. As such, the respective pulleys 38, 40 may not actively induce the material to change phase through conduction. These temperatures may be maintained, for example, through a heat transfer design that adds sufficient heat or cooling capacity to maintain the respective temperatures.

Figure 6:
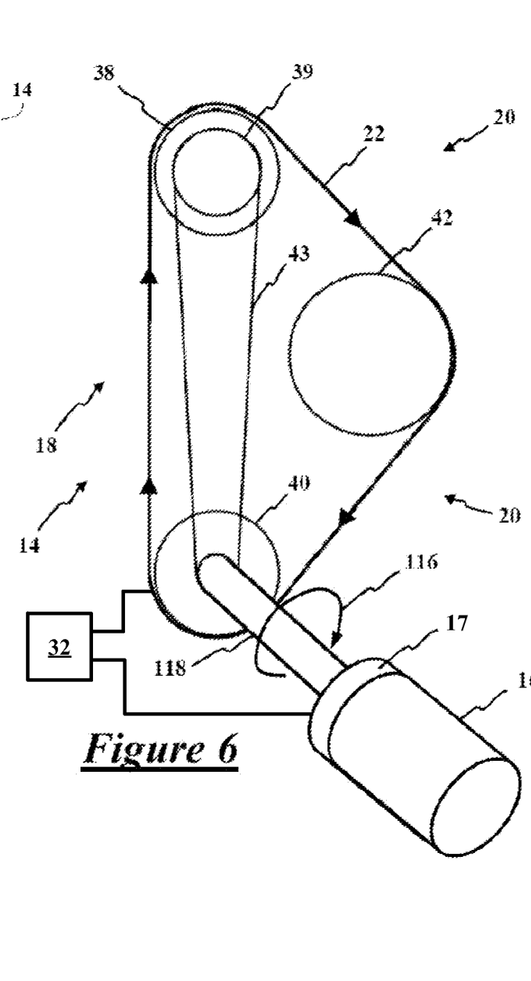
FIG. 6 is a schematic side view of the heat engine of FIG. 1, configured to receive thermal energy from a source and produce a mechanical output.

Referring to FIG. 6, and as generally described above, thermal energy provided to the SMA element 22 within the hot region 18 may impart a motion to the SMA 22. This motion may be captured as a rotation/torque 116 of an output shaft 118. In an embodiment, the output shaft 118 may be coupled to a driven component 16 through a coupling device 17. The coupling device 17 may include a transmission, gear reduction and/or clutch, which may allow the heat engine to better match the output power demands based on the torque 116 that may be available.

In operation, the coupling device 17 may operate as a clutch to prevent the heat engine from experiencing a stall condition (i.e., where the power demands of the driven component exceed the available torque 116 produced by the heat engine 14). For example, the clutch may be configured so that if the heat engine 14 slips below a certain speed, the driven component 16 (e.g., generator) may be disengaged partially or fully so that the engine speed may increase and the SMA 22 does not risk overheating. In such an embodiment, the clutch may be a centripetal force clutch that is only engaged above a particular rotational speed. In another embodiment, there may be a breakaway coupling, which disengages, or slips above a particular torque load. Alternatively, the clutch may be engaged by a separate SMA actuator that is configured to contract and engage the clutch when the temperature in the hot region is above a suitable level. The clutch may likewise be subject to active control, whereby the controller 32, may actively monitor the temperature of the SMA element 22, and disengage the clutch (or modify the gear ratio of a coupling device to decrease the load on the heat engine) if the temperature is above a predetermined threshold.

The coupling device 17 may further facilitate the startup of the heat engine 14 by de-coupling the driven component via the clutch-feature if the speed of the heat engine is below a predetermined threshold. For example, the controller 32 may monitor a rotational speed of one of the pulleys, and may selectively decouple the driven component 16 from the heat engine 14 to remove torque draw and/or minimize system inertia. Once de-coupled, the hot region may be shocked with a sharp step function of thermal energy (e.g., by activating a heating element or by removing an adjacent heat shield). This sudden shock may contribute to a rapid contraction of the SMA element 22 (i.e., a rapid austenitic transformation), which may be sufficient to overcome the static friction and inertia of the various pulleys or other rotating components. Alternatively, the driven component 16, such as a motor/generator may be driven by an auxiliary energy source to aid the startup procedure.

The coupling device 17 may similarly have a power transmission component that is configured to scale the power or speed of the output shaft based on the demands or needs of the driven component 16 and/or the available torque 116 produced by the heat engine 14. Such a transmission may have either a fixed power reduction ratio (e.g., gear ratio), or may dynamically adjust the ratio based on real-time demands/power availability. A dynamic adjustment may be performed, for example, by the coupling device 17 itself (e.g., in an active manner to maintain a constant torque or speed draw), or through active regulation by the controller 32.

In addition to including a power transmission component with the coupling device 17, based on the application of the system, the output shaft may be initially coupled with either of the working pulleys 38, 40. Because the pulleys have different angular velocities, caused by the ratio of the timing pulleys 39, 41, selection of the output pulley may provide an initial gearing for the system.

In another embodiment, the gear ratio between the two timing pulleys 39, 41 may be actively modified to dynamically adjust the system performance and/or to facilitate the startup of the heat engine 14. Utilizing an adaptive timing gear ratio could modify the efficiency and performance of the system to accommodate a wide range of operating conditions (e.g., ambient temperatures, system loads, transient conditions, etc. . . . ). In an embodiment, the system may utilize an SMA element (different from SMA element 22) as a temperature-dependent actuator to effectuate the adaptive gear ration. Other known methods of adaptive gearing may similarly be used.

In an embodiment, smooth operation of the system may be maintained through the inclusion of a flywheel. For example, the idler pulley 42, or some other auxiliary pulley may include flywheel-type attributes, or may be geared to a separate flywheel that may be used to maintain a constant wire power and temperature cycle over fluctuating heat transfer and/or power draw requirements. Traditional rotational flywheel designs may be used where the maximum amount of rotational inertia may be generated at the minimum possible weight.

To further increase the efficiency of the system, the heat engine 14 may be configured to recover the latent heat of the SMA element 22 when it expels the heat during its transition into a martensitic state. This may be accomplished, for example, by staging multiple heat engines 14 in series, where the cold region 20 of the first heat engine 14 is the hot region 18 of the second.

Figure 7:
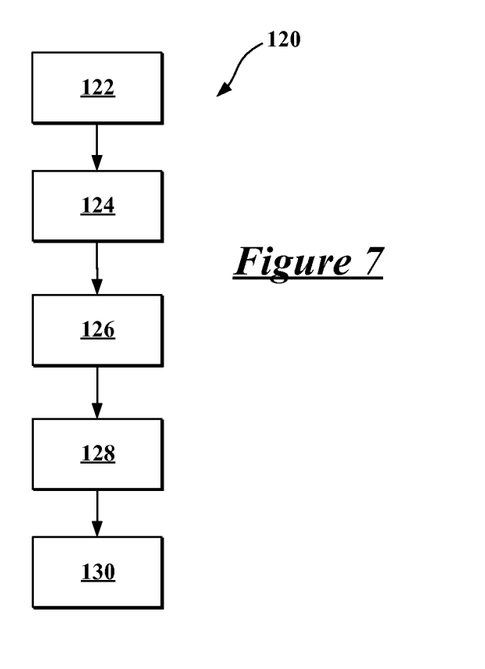
FIG. 7 is a flow diagram of a method for starting and operating a shape memory alloy heat engine.

FIG. 7 generally illustrates a method 120 of starting a heat engine 14. As shown, the method 120 may begin by detecting a thermal gradient between a hot region and a cold region using the controller 32 (step 122). If a gradient is detected, in one configuration, the driven component 16 may be initially powered using an external energy source to initiate motion of the SMA material (step 124). For example, where the driven component is an electric generator, step 124 may be performed by supplying electricity to the generator to elicit a rotation of the output shaft 118. This rotation may drive the one or more pulleys, which may begin a motion of the SMA material 22. In other configurations, the heat engine may be self-starting, and this step may be omitted.

Once the thermal gradient is detected and/or the SMA material begins generating a phase-change contractive force in the hot region 18, the driven component may be selectively decoupled in step 126 to reduce the system inertia (alternatively, the driven component may have been previously decoupled, such as during a shut-down routine). For example, as described above, the controller 32 may disengage a clutch of the coupling device 17. In step 128, the controller 32 may monitor the speed of the SMA material and compare the monitored speed to a predetermined threshold. Once the speed exceeds the threshold, the controller 32 may begin re-engaging the driven component 16 via actuation of the coupling device 17. In one configuration, the re-engaging may be a gradual re-engaging, such as through an adaptive gear-ratio or through the increasing application of a friction clutch. In this manner, the rotational inertia may gradually build, rather than suddenly shocking the system via a step function of increased system mass.

After the driven component is engaged in step 128, the controller may monitor the speed and/or the temperature of the SMA material 22 within the hot region 18. The controller 32 may adaptively control the coupling device 17 in step 130 to prevent the temperature from exceeding a predetermined over-temp threshold, or to prevent the SMA material from stalling (falling below a predetermined speed threshold). For example, if the monitored temperature exceeds a threshold, the controller may increase a gear ration of the coupling device to reduce the load on the heat engine.

To further enhance the efficiency, the following design factors/considerations/design elements described below may be accounted for and/or integrated when constructing the heat engine 14:

Air Flow Characteristics

For air heated and/or cooled configurations, the velocity (magnitude and direction) of the air stream relative to the wire length plays a role in the heat transfer ability—especially in the turbulent flow regime; the influence of air stream velocity on the overall heat transfer coefficient is weaker in the laminar flow regime. Considerations such as whether the air flow is parallel, perpendicular, counter, cross or has multiple directions relative to the direction of wire movement and the relative orientations of the spatial temperature gradients in the wire and the air stream also play a role. Fluctuations (direction or magnitude) in the air flow also improve heat transfer by promoting bulk mixing. Finally, the fractional content of water vapor and aerosols (e.g. soot, dust, etc.) also impact the heat transfer conditions by introducing density gradients that drive convective heat transfer or by mediating radiative heat transfer respectively. A heat engine 14 design may account for these air flow characteristics using traditional thermodynamic and fluid dynamic principles.

Phase Change Heat Transfer

Phase changes (e.g. condensing steam, evaporation, boiling) are associated with significantly larger (10-100×) heat transfer coefficients than forced convection. Moreover, phase changes occur at a constant temperature or fairly narrow temperature range which makes the analysis and optimal design and control of the heat exchange process easier. De-wetting agents and other surface modifications may be used to promote drop-wise instead of film condensation/boiling and help achieve a further 2-10× improvement in the effective heat transfer coefficient. Very high heat transfer rates can be achieved if the substance undergoing phase change is allowed to come in direct contact with the other substance e.g. saturated methanol or ammonia can evaporate directly from the SMA elements to achieve very high cooling rates at a nearly constant temperature; similarly, water can condense directly on the SMA elements to provide high heating rates at nearly constant temperature. A wire mesh, wiper seal, bed of rags, or other similar technique may be used to mitigate transport of the condensing liquid out of the heating chamber. Evaporative cooling may also be promoted by using jets/nozzles to spray a thin mist of the cooling medium on the wires or using a bed of rags/wire mesh/wiper to apply a thin coat of the cooling medium on the SMA element. The SMA element may be passed through moist steam/cold water saturated chamber or bed of rags to promote higher heating/cooling rates respectively.

Liquid Heating/Cooling

Liquid to solid heat transfer rates are roughly 10× higher than gas to solid heat transfer rates. Accordingly, a hot or cold liquid bath may be used to heat or cool the SMA elements respectively.

Thermal Radiation

Thermal radiation in the UV, visible and IR bands may be used to heat/cool the SMA elements. Sunlight with suitable focusing reflectors can be used to quickly and uniformly heat SMA elements. Cooled heat sinks with high absorptivity in the range of wavelengths with maximum emittance for the SMA wires can be used to cool the wires quickly.

Solid-to-Solid Heat Transfer

Solid to solid heat transfer rates are much higher than liquid to solid ones; they have the same order of magnitude as phase change heat exchange rates. This may be exploited to promote higher heating/cooling rates in the heat engine, for example, by using heated/cooled pulleys over which the elements are passed (though avoiding phase change on the pulley), by moving hot/cold blocks with high thermal capacity into and out of contact with the wires, etc.

Turbulence/Bulk Mixing Promoters

Flow modifiers such as extended surfaces, trip wires, inlet swirl generators, twisted surfaces, and other similar modifiers that promote turbulence and the associated bulk fluid mixing have been known to significantly increase the heat transfer rates. A simple staggering of alternate rows of SMA elements in a multi-row arrangement of SMA elements can lead to high heat transfer rates in the downstream rows. Eddies and vortices generated by flow over the elements in the leading row coupled with the acceleration of the flow as it passes by the leading row of elements leads to higher heat transfer rates in the downstream rows of SMA elements. Blades or other flow modifiers attached to pulleys can also be used to improve heat transfer rates.

Smart Flow Guides

Guides that direct the flow of the heating/cooling fluid onto the SMA elements can themselves be made of an active element, such as shape memory alloy. The response of this active element to a change in its operating environment can be used to modulate the heat transfer to/from the SMA elements 22. For example, other thermally activated SMA elements may be used to bypass some flow of the heating fluid if the temperature of the hot fluid rises beyond a safe level.

Vibration Induced Heat Transfer Enhancement

Vibration of the wires (e.g. in a plane orthogonal to the wire length) has been shown to increase the heat transfer rates by a factor of 10. Both: high amplitude, low frequency and low amplitude, high frequency vibrations help enhance heat transfer. As such, in an embodiment, such vibrations may be imparted to the SMA element 22.

Electric Field Induced Heat Transfer Enhancement

Electric fields have been shown to improve heat transfer in a medium with conducting particles (e.g. in ionized gas) by directly exerting forces on the charged particles thereby influencing the mixing of fluid in their vicinity. However, electric fields can also promote mixing in dielectric fluid media due to dielectrophoresis. Hence, electric fields can be used to enhance and control heat transfer rates to/from the SMA element 22

Regenerators

Regenerator-type heat exchangers can be used to improve the performance of the heat engine by both providing a thermal buffer to store heat and by using any stored heat to pre-heat the SMA elements. By preventing cooling of the SMA elements below a characteristic temperature, such a regenerator-type heat exchanger can reduce the amount of heat input required for the reverse transformation on heating, which may thereby improve the energy conversion efficiency of the system.

Heat Pipes

Heat pipes can be used to efficiently transport heat from the source to the SMA elements and/or from the SMA elements to the sink. Fixed or variable conductance heat pipes may be used to mitigate temperature drops during heat transfer between the source, SMA elements and the sink.

Vortex Tubes

Where ram air can be converted into a high static air pressure (e.g. in a moving vehicle), this high pressure air can be thermodynamically split into a cold stream and a hot stream in a vortex tube. These streams can be used to enhance the cooling and heating rates respectively.

While many approaches to a heat engine design have been outlined herein, they may each, either independently or collectively be used to improve the heat transfer rate or efficiency of a shape memory alloy heat engine or to improve its controllability. Therefore, no one approach should be considered limiting or exclusive, as many or all embodiments may be used collectively or in combination. While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of starting and operating a shape memory alloy (SMA) heat engine having a first rotatable pulley, a second rotatable pulley, and an SMA material disposed about the first and second rotatable pulleys and between a hot region and a cold region, the method comprising:
   detecting a thermal energy gradient between the hot region and the cold region using a controller;
   decoupling an electrical generator from one of the first and second rotatable pulleys;
   monitoring a speed of the SMA material about the first and second rotatable pulleys;
   re-engaging the electrical generator if the monitored speed of the SMA material exceeds a threshold; and
   wherein the SMA material is configured to selectively change crystallographic phase between martensite and austenite, thereby converting the thermal energy gradient between the hot region and the cold region into mechanical energy.

2. The method of claim 1, further comprising initiating movement of the SMA material using the electrical generator prior to decoupling the electrical generator from the one of the first and second rotatable pulleys.

3. The method of claim 1, wherein decoupling the electrical generator from the one of the first and second rotatable pulleys includes commanding a coupling device to disengage via the controller.

4. The method of claim 3, wherein the coupling device includes an electrically actuated clutch.

5. The method of claim 1, further comprising monitoring a temperature of the SMA material; and
   modifying a gear ratio of an adaptive torque transmitting device disposed between the electrical generator and the rotatable pulley to reduce a torque load on the heat engine if the temperature of the SMA material exceeds a predetermined threshold.

6. A method of starting and operating a shape memory alloy (SMA) heat engine having a first rotatable pulley, a second rotatable pulley, and an SMA material disposed about the first and second rotatable pulleys and between a hot region and a cold region, the method comprising:
   detecting a thermal energy gradient between the hot region and the cold region using a controller;
   initiating movement of the SMA material using an electrical generator coupled with one of the first and second rotatable pulleys;
   decoupling the electrical generator from one of the first and second rotatable pulleys following the initiation of movement;
   monitoring a speed of the SMA material about the first and second rotatable pulleys;
   re-engaging the electrical generator if the monitored speed of the SMA material exceeds a threshold; and
   wherein the SMA material is configured to selectively change crystallographic phase between martensite and austenite, thereby converting the thermal energy gradient between the hot region and the cold region into mechanical energy.

7. The method of claim 6, wherein decoupling the electrical generator from the one of the first and second rotatable pulleys includes commanding a coupling device to disengage via the controller.

8. The method of claim 7, wherein the coupling device includes an electrically actuated clutch.

9. The method of claim 7, wherein the coupling device includes a clutch and an SMA actuator configured to engage the clutch when the temperature of the hot region exceeds a predetermined temperature.

10. The method of claim 6, further comprising monitoring a temperature of the SMA material; and
    modifying a gear ratio of an adaptive torque transmitting device disposed between the electrical generator and the rotatable pulley to reduce a torque load on the heat engine if the temperature of the SMA material exceeds a predetermined threshold.

* * * * *